June 13, 1961 M. J. TAUSCHEK 2,988,188
TEMPERATURE SENSITIVE DRIVE
Filed Nov. 26, 1958
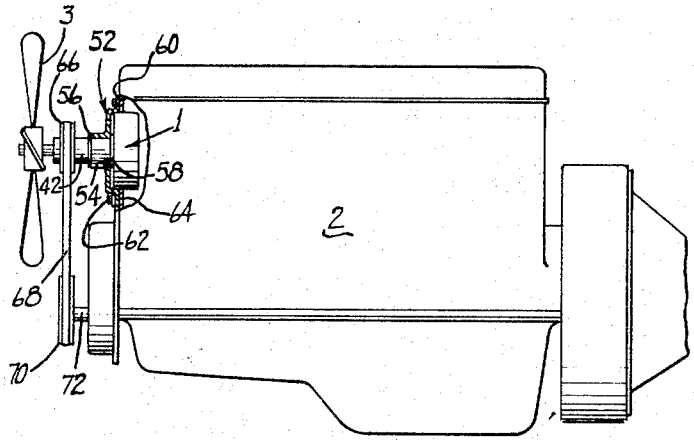
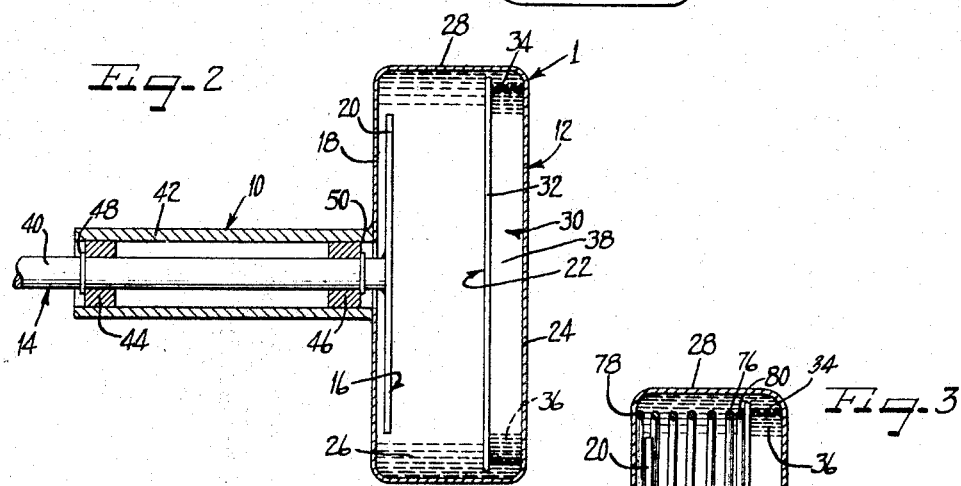
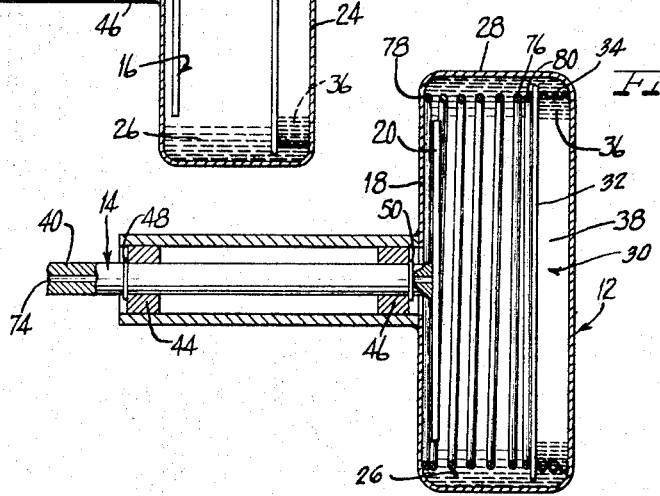
Inventor
Max J. Tauschek
by Hill, Sherman, Meroni, Gross & Simpson Attys

United States Patent Office 2,988,188
Patented June 13, 1961

2,988,188
TEMPERATURE SENSITIVE DRIVE
Max J. Tauschek, Lyndhurst, Ohio, assignor to Thompson Ramo Wooldridge Inc., Cleveland, Ohio, a corporation of Ohio
Filed Nov. 26, 1958, Ser. No. 776,617
14 Claims. (Cl. 192—82)

This invention relates to a drive coupling for use in driving fans for vehicles or the like and more particularly to a temperature-sensitive drive which is self-contained within a clutch housing and actuates the clutch by fluid means controlled by an ambient temperature condition.

Heretofore, various types of temperature sensitive drives have been available but these have suffered from the fact that either the temperature control has required external connections outside of the clutch means or it has involved shifting of the drive elements under load.

The present invention is directed to fluid drives of the type which may be used for driving fans for automotive vehicles or the like, although the application of the invention is not restricted to its use with such devices. The drive may be used in conjunction with air cooled engines, or in any environment requiring temperature sensitive drive control, and comprises concentric driving and driven shafts carrying fluid clutch members. The clutch may be of a conventional hydro-dynamic design, or it may comprise closely spaced parallel plates adapted to transmit torque by viscous drag. One element of the clutch is a chamber or housing attached to the driving member and having an inner wall cooperating with a complementary clutch member attached to the driven member and journalled in the housing. The housing contains a working fluid and has a diameter such that the clutch member on the driven shaft is spaced radially therefrom. As the driving member is rotated, therefore, the working fluid is held away from the clutch by centrifugal force. A bellows-like container is mounted on a thermally sensitive wall opposite the clutch wall of the housing and is filled with a thermally sensitive fluid adapted to expand or volatilize in response to a predetermined temperature condition as transmitted through the temperature-sensitive wall. The radial dimensions of the bellows-like container are such as to maintain contact with the working fluid even when it is held away from the clutch in the disengaged condition of the clutch. When the bellows member expands a predetermined extent toward the clutch wall of the housing, the working fluid is displaced radially inwardly to an extent such as to engage the clutch members and afford driving relation between the driving and driven members. As indicated, a relatively viscous fluid is used where the clutch is of the parallel plate variety shown in the drawings.

In order to afford modulation of the operation of the expansible temperature-sensitive means, a gas such as air may be maintained under pressure within the housing, although the bellows may be also operated against atmospheric pressure. In this latter case, means may be provided for venting the housing to atmospheric pressure through the shafts of the driving and driven elements.

In another embodiment of the invention, the modulating means may be a spring element which has a radial dimension which extends from the clutch wall of the housing in spacial relation to the other clutch element and into contact with the interior wall of the bellows.

The fluid in the thermally responsive control element may be any fluid having a vapor pressure curve permitting engagement of the drive at a predetermined temperature. Where the drive means of the invention is used for an automotive fan or the like, the fluid may be an alcohol adapted to volatilize in the neighborhood of 135°, or at a temperature appropriate for the type of motor with which the drive is employed, in accordance with whether the engine is of the air-cooled or water-cooled type. In the latter case, a fluid adapted to volatilize in the neighborhood of 160° may be used in the bellows.

Accordingly, it is an object of the present invention to provide a drive wherein thermally responsive control means are self-contained in a clutch-housing and adapted to control the clutch in accordance with ambient temperature conditions.

Another object of the invention is to provide a temperature sensitive drive in whch engagement and disengagement of the clutch does not require shifting of the drive elements under load.

Another object of the invention is to provide a drive means as described in which the clutch is controlled by expansible temperature sensitive fluid means.

Another object of the invention is to provide a drive as described in which the temperature sensitive fluid means includes a bellows member and a fluid within the bellows member having a vapor pressure curve such as to expand the bellows and engage the drive at a predetermined temperature.

Another object of the invention is to provide a drive as described including a housing attached to the driving member and adapted to maintain a working fluid for the clutch in spaced relation to the clutch elements during roatation of the drive member and adapted to permit the working fluid to be displaced radially inwardly to engage the clutch means in response to said expansion of said bellows member.

Another object of the invention is to provide a drive means as described in which the housing has a temperature responsive wall forming the outer wall of the said bellows member.

Another object of the invention is to provide a temperature sensitive fluid control means as described and means for modulating the action of the control means.

Other objects and advantages of the invention will become apparent as the description proceeds in accordance with the drawings in which:

FIGURE 1 is a side elevational view of a temperature sensitive drive according to the invention in operative relation to a fan and internal combustion engine.

FIGURE 2 is a vertical sectional view of a drive according to the invention; and FIGURE 3 is a vertical sectional view of another embodiment of the drive of the invention.

Referring now to FIGURES 1 and 3, a temperature sensitive drive 1 is shown in accordance with the present invention in association with an internal combustion engine 2 which may be of the air cooled type, through the invention is not restricted thereto, and a fan 3 driven by the drive 1 as hereinafter set forth. The drive 1 comprises a driving member 10 to which a housing 12 is fixedly secured for co-rotation therewith, a driven member 14, a clutch 16 in the housing including a clutch plate 18 provided by the housing and a disc 20 and an expansible temperature responsive fluid control element 22 controlled by the heat transmitted by a temperature sensitive wall 24 of the housing.

Although the clutch 16 may be of the conventional hydro-dynamic type, in the embodiment shown, the opposed discs or plates 18 and 20 are adapted to be brought into engaged relationship by a relatively viscous fluid 26. The fluid 26 may be any suitable oil of a grade such as to provide the desired friction characteristics relative to the opposed discs 18 and 20, and it will be understood that a lighter oil would be used for a hydro-dynamic type of clutch. The housing 12 has an annular outer wall 28 which is radially spaced from the clutch elements 18 and 20 a distance such as to maintain the working fluid 26 out of contact with the clutch elements 18 and 20 during rotation of the drive member 10 and the housing 12, as a result of the effect of centrifugal force on the working fluid.

The temperature sensitive fluid control 22 comprises the temperature sensitive wall 24 of the housing 12 and a bellows member 30, having an axially movable inner wall 32 disposed in substantially parallel relation to the thermally sensitive wall 24. An accordion pleated annular wall 34 connects the variably spaced inner wall 32 with the outer wall 24 and is sealingly secured to the wall 24 in any suitable manner. Within the bellows container 30 a temperature responsive fluid 36 is provided whose vapor pressure curve is determined in accordance with the conditions required for engagement of the clutch element at a given temperature. For purposes of illustration, an alcohol having a temperature of volatilization of substantially 135 to 160° may be used. Thus the vapor 38 within the bellows 30 will ordinarily maintain the wall 32 at a distance from the fixed housing wall 24 which will hold the working fluid 26 out of contact with the clutch, with the liquid 36 and vapor 38, balancing axially directed force components resulting from the rotation of the working fluid 26. Upon expansion of the bellows in response to a predetermined temperature transmitted through the wall 24, the wall 32 will be moved toward the clutch plates 18 and 20 and the working fluid 26 will be displaced radially inwardly to an extent which will cause it to engage the said clutch plates. Conversely, when the temperature applied to the fluid 36 is reduced by a predetermined extent, the bellows will contract as a result of the component of force directed axially outwardly toward the wall 24, so that the working fluid will again be disposed radially outwardly in the inoperative position thereof. It will be seen, therefore, that the fluid clutch relationship is such as to prevent too great a rate of rotation or of torque on the fan element 3, while nevertheless energizing the fan at the high temperature condition which may result from a high rate of operation of the drive element.

The engagement and disengagement of the clutch 16 may therefore be accomplished without the need for shifting the clutch elements under load, and it will be seen that the driven element 14 includes a shaft 40 journalled concentrically in the shaft 42 of the driving element 10 by means of bushings 44 and 46, with snap ring means 48 and 50 being provided on the shaft 40 in abutting engagement with the bushings to maintain the shafts 40 and 42, and clutch plates 18 and 20 in fixed axial relation. The fan 3 is secured to the shaft 40 in any suitable manner in predetermined proximate relationship to the engine 2.

In the embodiment shown, the shaft 42 is journalled in a bearing cap 52 defining a cylindrical bearing 54 against which a snap ring 56 may be engaged, and a similar snap ring 58 may be utilized to hold the shaft 42 in axially fixed relation to the engine. The bearing cap 52 defines a peripheral flange 60 which is bolted by bolts 62 to the wall 64 of the engine, and the wall 24 of the housing will thus be disposed in thermal communication with the cooling system of the engine. As stated, the engine may be of the air cooled type, but it will be appreciated that the invention may also be used in a water cooled engine.

In order to drive the shaft 42, a pulley 66 is fixedly secured thereto and a belt 68 entrained on the pulley to transmit torque from a pulley 70 on the crank shaft 72. However, other systems for driving the shaft 42 may be used within the scope of the invention as will be appreciated by those skilled in the art.

The control means 22 may be operated against the pressure of a gas within the housing 12 or it may be operated against atmospheric pressure. In the embodiment of Figure 3, the shaft 40 defines an axial bore 74 leading from the interior of the housing to atmosphere. In order to modulate the action of the control means, a spring 76 may be provided having one end 78 in bearing engagement with the plate or wall 18 and in spaced relation to the plate 20, while the end 80 of the spring bears against the wall 32 of the bellows 30.

There has thus been provided a temperature sensitive drive which eliminates the need for external controls, but which is accurate and efficient in operation and is useful in a wide variety of applications in addition to the illustrated use in driving a fan for an air cooled internal combustion engine. Because there is little or no wear between working parts, the drive is exceptionally long-lasting and affords minimum maintenance and replacement expense. Further, the operation of the drive is uniform, since no shifting of the drive elements under load is required, and the entire drive is of unusual simplicity of construction and may be manufactured at relatively low cost.

Although the use of a volatile fluid in the chamber 30 is advantageous because its vapor pressure is independent of the volume and thus solely a function of temperature, and also because such a fluid permits centrifugal force effects arising from the fluid 26 to be controlled, a fluid in the nature of a gas may also be used, as well as other thermally responsive means, such as a bi-metallic element for actuating the wall 32.

The apparatus of the invention is speed-sensitive as well as temperature-sensitive in the embodiment shown. The vapor pressure in the chamber 30 is not affected by the amount of fluid in the chamber, as stated, and if a relatively large amount of fluid 36 is used, so that its interior surface is closer to the axial center line than the interior surface of the fluid 26, centrifugal effects will tend to increase the engagement of the clutch as the speed is increased. On the other hand, if a relatively small amount of fluid 36 is used in comparison to the amount of fluid 26, centrifugal forces will tend to decrease the amount of clutch engagement as the speed is increased. This latter type of speed sensing is particularly advantageous for passenger car use when it is desirable to reduce the ratio of fan speed to engine speed when the engine speed is high.

The temperature sensing surface 24 permits a wide variety of applications. Thus, the surface can be immersed in a fluid stream to transfer heat to the control element by conduction, as exemplified by installation in the radiator air stream or in the coolant system of a liquid cooled engine. Also, the temperature sensing surface can receive heat by radiation transfer, in which case it is preferably painted with a flat black paint for good heat absorption, and located in the engine system so that it "sees" a heat-emitting surface such as a cylinder head or exhaust pipe. It will also be understood that the member 14 may be advantageously used as the driving member and member 10 as the driven member in various applications.

Although I have herein set forth and described my invention with respect to certain specific principles and details thereof, it will be obvious to those skilled in the art that these may be varied without departing from the spirit and scope of the invention as set forth in the hereunto appended claims.

I claim as my invention:

1. In a fan drive for an internal combustion engine, a driving member, means for supporting the driving member in journalled relation to an internal combustion engine, a housing on said driving member in heat conductive relation to the engine, said housing having a thermally sensitive wall, a driven member journalled in said driving member, a fan on said driven member, pulley means for connecting said driving member and the crank shaft of the engine, temperature responsive means on said temperature sensitive wall adapted to expand in response to a predetermined temperature condition transmitted by said wall, clutch means in said housing for said driving member and said driven member and a supply of working fluid in said housing adapted to be disposed in spaced relation to said clutch means during rotation of said driving member and to be displaced into clutch engaging relationship with said clutch means by said temperature responsive means when said temperature responsive means has expanded a predetermined amount.

2. A drive comprising a driving member having a hollow shaft and a housing on one end of said shaft, a driven member having a shaft journalled in the shaft of said driving member and carrying a clutch member in said housing, said housing having a wall providing a complementary clutch member, a supply of fluid in said housing, a temperature-sensitive wall in said housing, a bellows member on said temperature-sensitive wall in spaced relationship to said clutch members, and fluid means in said bellows member adapted to expand said bellows member in response to a predetermined temperature condition at said temperature-sensitive wall to cause said supply of fluid in said housing into clutch engaging relationship with said clutch members during rotation of said driving member, said supply of fluid being normally spaced from said clutch member on said driven member during rotation of said driving member.

3. A drive comprising a driving member having a hollow shaft and a housing on one end of said shaft, a driven member having a shaft journalled in the shaft of said driving member and a clutch member within said housing, said housing having a wall providing a complementary clutch member, means maintaining said driving member and said driven member in axially fixed relationship, a supply of fluid in said housing, a temperature-sensitive wall in said housing, a bellows member on said temperature-sensitive wall in spaced relation to said clutch members and fluid means in said bellows member adapted to expand said bellows member in response to a predetermined temperature condition transmitted by said temperature-sensitive wall to cause said supply of fluid in said housing to effect driving engagement of said clutch members during rotation of said driving member, said supply of fluid being normally spaced from said clutch member on said driven member during rotation of said driving member.

4. A drive comprising a driving member having a hollow shaft and a housing on one end of said shaft, a driven member having a shaft journalled in the shaft of said driving member and a clutch plate within said housing, said housing having a wall providing a complementary clutch plate, said shaft and clutch plate of said driven member defining an axial bore therethrough for venting said housing to atmosphere, means maintaining said driving member and said driven member in axially fixed relationship, a supply of fluid in siad housing, a temperature-sensitive wall in said housing, a bellows member on said temperature-sensitive wall in spaced relationship to said clutch plates and fluid means in said bellows member adapted to expand said bellows member in response to a predetermined temperature condition to cause said supply of fluid in said housing to engage said clutch plates by movement therebetween during rotation of said driving member, said supply of fluid being normally spaced from said clutch plate on said driven member during rotation of said driving member.

5. A drive comprising a driving member having a hollow shaft and a housing on one end of said shaft, a driven member having a shaft journalled in the shaft of said driving member and a clutch plate within said housing, said housing having a wall providing a complementary clutch plate, said shaft and clutch plate of said driven member defining an axial bore therethrough for venting said housing to atmosphere, means maintaining said driving member and said driven member in axially fixed relationship, a supply of fluid in said housing, a temperature-sensitive wall in said housing, a bellows member on said temperature-sensitive wall in spaced relationship to said clutch plates, fluid means in said bellows member adapted to expand said bellows member in response to a predetermined temperature condition to cause said supply of fluid in said housing to engage said clutch plates by movement therebetween during rotation of said driving member, said supply of fluid being normally spaced from said clutch plate on said driven member during rotation of said driving member and spring means bearing against said housing and said bellows member for modulating the action of said bellows member.

6. A drive comprising a driving member having a hollow shaft and a housing on one end of said shaft, a driven member having a shaft journalled in the shaft of said driving member and a clutch plate within said housing, said housing having a wall providing a complementary clutch plate, means maintaining said driving member and said driven member in axially fixed relationship, a supply of fluid in said housing, a temperature-sensitive wall in said housing, a bellows member on said temperature-sensitive wall in spaced relationship to said clutch plates, fluid means in said bellows member adapted to expand said bellows member in response to a predetermined temperature condition to cause said supply of fluid in said housing to engage said clutch plates by movement therebetween during rotation of said driving member, said supply of fluid being normally spaced from said clutch plate on said driven member during rotation of said driving member and spring means bearing against said housing and said bellows member for modulating the action of said bellows member.

7. A fluid drive coupling comprising a housing, a drive member, a driven member, clutch means in said housing for said drive member and said driven member, a supply of working fluid in said housing controlling engagement of said clutch means, an expansible chamber in said housing controlling said working fluid and a supply of fluid in said expansible chamber means effecting expansion of said expansible means and movement of said working fluid into clutch engaging relationship with said clutch means at a predetermined temperature, said working fluid and said fluid in said expansible chamber cooperating to afford a speed sensing control for said clutch means.

8. A drive coupling comprising a drive member having a housing, a driven member, said drive member and said driven member each having a clutch member disposed in mutually axially fixed relationship, a supply of working fluid in said housing, and means responsive to increases in temperatures for reducing the space occupied by the working fluid and moving the working fluid radially inwardly into engagement with said clutch members to couple said clutch members during rotation of the driving member.

9. A drive coupling comprising a driving member having a housing providing a clutch member, a driven member having a clutch member journalled in said housing in fixed axial relation to the clutch member of said housing, a supply of working fluid in said housing, and means in said housing adapted to expand in response to temperature increases, said working fluid being normally disposed out of engagement with said clutch members during rotation of said driving member and being displaced into engagement with said clutch members to couple the same when said expansible member expands a predetermined amount in response to said temperature increases.

10. A drive coupling comprising a drive member having a housing, a clutch member fixed in said housing, a clutch member journalled in said housing, and a temperature expansible means in said housing extending radially outwardly beyond said clutch member journalled in said housing, said working fluid being normally disposed radially outwardly of said clutch member journalled in said housing during rotation of said housing and being in engagement with said clutch members to couple the same in an expanded condition of said expansible means.

11. A drive coupling comprising a drive member including a housing with a clutch member formed by one wall thereof, a clutch member journalled in said housing in axially fixed relation to said clutch member in said housing, an expansible container on a temperature-sensitive wall of said housing opposite said clutch member of said housing and having a wall movable toward said clutch member of said housing in continuously spaced relationship thereto, a temperature sensitive fluid in said container adapted to expand the container and its wall axially inwardly toward the clutch member formed by said wall of said housing in response to temperature increases in said temperature-sensitive wall, and a working fluid in said housing normally disposed radially outwardly of said clutch member journalled in said housing during the rotation of said housing but engaging said clutch members in response to axially inward movement of said container wall.

12. A fluid drive coupling comprising a housing, a drive member, a driven member, clutch means in said housing for said drive member and said driven member, a supply of working fluid in said housing normally in non-operative relation to said clutch means, an expansible chamber in said housing controlling engagement of said working fluid with said clutch means, and temperature sensitive means for expanding said chamber to cause said working fluid to move radially inwardly to engage said clutch means at a predetermined temperature.

13. A fluid drive coupling comprising a housing, a drive member, a driven member, clutch means in said housing for said drive member and said driven member, a supply of working fluid in said housing normally in non-operative relation to said clutch means, an expansible chamber in said housing controlling engagement of said working fluid with said clutch means, and a supply of fluid in said expansible chamber for expanding said chamber to cause said working fluid to move radially inwardly to engage said clutch means at a predetermined temperature.

14. A coupling which comprises a driving element, a driven element spaced therefrom to provide therebetween a coupling space of constant volume, means defining a chamber, coupling fluid flowable into and out of said space, and expansible and contractable means in said chamber to vary the volume of said chamber and thereby control amount of fluid in said space, and said expansible and contractable means being sensitive to centrifugal force loading of the fluid for contracting the means and to temperature for expanding the means.

References Cited in the file of this patent
UNITED STATES PATENTS

| | | |
|---|---|---|
| 1,820,035 | Stokes | Aug. 25, 1931 |
| 2,046,723 | Brownscombe | July 7, 1936 |
| 2,352,478 | Halford | June 27, 1944 |
| 2,633,697 | Johnson | Apr. 7, 1953 |
| 2,765,893 | Stuart | Oct. 9, 1956 |
| 2,838,244 | Oldberg | June 10, 1958 |